(12) United States Patent
Ohta et al.

(10) Patent No.: US 11,074,102 B2
(45) Date of Patent: Jul. 27, 2021

(54) PARALLEL PROCESSING APPARATUS

(71) Applicant: FUJITSU LIMITED, Kawasaki (JP)

(72) Inventors: Koudai Ohta, Fuchu (JP); Toshikatsu Matsuura, Fujisawa (JP); Hitoshi Matsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/879,818

(22) Filed: May 21, 2020

(65) Prior Publication Data

US 2020/0387397 A1 Dec. 10, 2020

(30) Foreign Application Priority Data

Jun. 5, 2019 (JP) .............................. JP2019-105442

(51) Int. Cl.
*G06F 11/07* (2006.01)
*G06F 9/48* (2006.01)

(52) U.S. Cl.
CPC ........ *G06F 9/4812* (2013.01); *G06F 11/0724* (2013.01); *G06F 11/0751* (2013.01); *G06F 11/0772* (2013.01)

(58) Field of Classification Search
CPC ........................... G06F 9/4812; G06F 11/0724
See application file for complete search history.

(56) References Cited

U.S. PATENT DOCUMENTS

| 2006/0150009 A1 | 7/2006 | Takemori |
| 2006/0184349 A1 | 8/2006 | Goud et al. |
| 2007/0005828 A1* | 1/2007 | Diamant ............... G06F 9/4812 |
| | | 710/48 |

FOREIGN PATENT DOCUMENTS

| JP | 2002-259130 A | 9/2002 |
| JP | 2006-178557 A | 7/2006 |
| JP | 2008-523512 A | 7/2008 |

OTHER PUBLICATIONS

Intel et al, "IPMI Intelligent Platform Management Interface Specification Second Generation v2.0", Oct. 1, 2013, pp. 1, 2, 12-25, 71-92 (Year: 2013).*

(Continued)

*Primary Examiner* — Matthew M Kim
*Assistant Examiner* — Kyle Emanuele
(74) *Attorney, Agent, or Firm* — Fujitsu Patent Center

(57) ABSTRACT

A parallel processing apparatus includes: nodes that execute information processing; and a control device, wherein the control device includes processing units provided corresponding to the nodes and configured to process a command received from the corresponding node and a data string, each of the processing units includes a reception data register in which data pieces in a reception data string are stored, a reception data buffer to which the data piece is transferred from the reception data register, a reception completion detector that detects completion of transfer of the reception data string, a fault detector that detects whether the received command is a fault command, and an interrupt issuer that issues an interrupt based on detection of the fault command, and issues an interrupt based on detection of the completion of the transfer of the reception data string when the fault detector does not detect the fault command.

5 Claims, 13 Drawing Sheets

(56) References Cited

OTHER PUBLICATIONS

Extended European Search Report dated Nov. 6, 2020 for corresponding European Patent Application No. 20175005.6, 10 pages.
"- IPMI—Intelligent Platform Management Interface Specification Second Generation v2.0", Intel et al., XP055744742, Retrieved from the Internet: URL:https://www.intel.com/content/dam/www/public/us/en/documents/product-briefs/ipmi-second-gen-interface-spec-v2-rev1-1.pdf [retrieved on Oct. 28, 2020], Oct. 1 2013, pp. 1-2, 12-25, and 71-92.

* cited by examiner

FIG. 4

| COMMAND CODE | NAME | BRIEF EXPLANATION |
|---|---|---|
| 60h | GET_STATUS/ABORT | STATUS ACQUISITION/Abort OPERATION |
| 61h | WRITE_START | START OF WRITING OF REQUEST DATA |
| 62h | WRITE_END | END OF WRITING OF REQUEST DATA |
| 63-67h | reserved | - |
| 68h | READ | DURING READING OF REQUEST DATA |
| 69-6Fh | reserved | - |

FIG. 5

| REQUEST DATA FORMAT (RECEPTION DATA BUFFER 526) | | |
|---|---|---|
| Byte 1 | Byte 2 | Byte 3:N |
| NetFn/LUN | Cmd | Data |
| RESPONSE DATA FORMAT (TRANSMISSION DATA BUFFER 528) | | | |
| Byte 1 | Byte 2 | Byte 3 | Byte 4:N |
| NetFn/LUN | Cmd | Completion Code | Data |

FIG. 6

| | | Byte | Data Field |
|---|---|---|---|
| REQUEST | NetFn/LUN | 1 | 30h |
| | Cmd | 2 | 00h |
| | Data | 3 | CODE INDICATING OPERATION STATUS OF NODE<br>00h:NODE IS IN STOPPED STATUS<br>01h:NODE OS IS IN Panic STATUS<br>02h:NODE OS STARTS Shutdown<br>03h TO 07h:reserved<br>08h:NODE IS DURING INITIALIZATION<br>09h:NODE OS IS BOOTING<br>0Ah:NODE OS IS IN ACTIVE STATUS<br>0Bh:UEFI Shell IS IN ACTIVE STATUS<br>0Ch TO FFh:reserved |
| | | 4 | ADDITIONAL INFORMATION<br>REASON FOR Shutdown START IS INDICATED WHEN OPERATION STATUS OF NODE IS Shutdown START.<br>00h:NORMAL Shutdown<br>01h:ANOMALOUS Shutdown |
| | | 5:6 | Reserved |
| RESPONSE | NetFn/LUN | 1 | 30h |
| | Cmd | 2 | 00h |
| | Completion Code | 3 | 00h:NORMAL TERMINATION |
| | Data | - | - |

FIG. 7

| REQUEST DATA (RECEPTION DATA BUFFER 526) | | | | | |
|---|---|---|---|---|---|
| Byte 1 | Byte 2 | Byte 3 | Byte 4 | Byte 5 | Byte 6 |
| 30h | 00h | 0Ah | 00h | 00h | 00h |
| RESPONSE DATA (TRANSMISSION DATA BUFFER 528) | | | | | |
| Byte 1 | Byte 2 | Byte 3 | | | |
| 30h | 00h | 00h | | | |

FIG. 8

|  |  | Byte | Data Field |
|---|---|---|---|
| REQUEST | NetFn/LUN | 1 | 31h |
|  | Cmd | 2 | 01h |
|  | Data | - | - |
| RESPONSE | NetFn/LUN | 1 | 31h |
|  | Cmd | 2 | 01h |
|  | Completion Code | 3 | 00h:NORMAL TERMINATION |
|  | Data | 4:7 | SYSTEM TIME (UTC)<br>* CUMULATIVE SECONDS SINCE JANUARY 1, 1970 |

FIG. 9

| REQUEST DATA (RECEPTION DATA BUFFER 526) | | | | | | |
|---|---|---|---|---|---|---|
| Byte 1 | Byte 2 | | | | | |
| 31h | 01h | | | | | |
| RESPONSE DATA (TRANSMISSION DATA BUFFER 528) | | | | | | |
| Byte 1 | Byte 2 | Byte 3 | Byte 4 | Byte 5 | Byte 6 | Byte 7 |
| 31h | 01h | 00h | 5ch | bdh | 85h | e5h |

PARALLEL PROCESSING APPARATUS

CROSS-REFERENCE TO RELATED APPLICATION

This application is based upon and claims the benefit of priority of the prior Japanese Patent Application No. 2019-105442, filed on Jun. 5, 2019, the entire contents of which are incorporated herein by reference.

FIELD

The embodiment is related to a parallel processing apparatus.

BACKGROUND

A parallel processing apparatus is used in various situations.

Related art is disclosed in Japanese Laid-open Patent Publication No. 2006478557, Japanese National Publication of International Patent Application No. 2008-523512 and Japanese Laid-open Patent Publication No. 2002-259130.

SUMMARY

According to one aspect, a parallel processing apparatus includes: a plurality of nodes that execute information processing; and a control device that controls the plurality of nodes, wherein the control device includes a plurality of processing units that are provided respectively corresponding to the plurality of nodes and that each process a command received from the corresponding node and a data string following the command, each of the plurality of processing units includes a reception data register in which data pieces in a reception data string following a command received from the corresponding node are stored sequentially piece by piece, a reception data buffer to which every time a data piece is stored into the reception data register, the data piece is transferred from the reception data register, a reception completion detector that detects completion of transfer of the reception data string to the reception data buffer, a fault detector that detects whether the received command is a fault command indicating a fault status of the corresponding node, and an interrupt issuer that issues an interrupt based on detection of the fault command by the fault detector, and issues an interrupt based on detection of the completion of the transfer of the reception data string by the reception completion detector when the fault detector does not detect the fault command, and the control device further includes interrupt procession units that are provided respectively corresponding to the plurality of nodes and each execute interrupt processing based on an interrupt issued by the corresponding interrupt issuer. According to an aspect of the embodiments, an apparatus includes The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of commands to be written to a command register in FIG. 3.

FIG. 5 is a diagram illustrating an example of data formats stored in a reception data register and a transmission data register in FIG. 3.

FIG. 6 is a diagram illustrating an example of data formats to be used in the case where a node in FIG. 2 makes a notification of an operation status.

FIG. 7 is a diagram illustrating an example of request data for a notification of an operation status of a node and its response data in the data formats illustrated in FIG. 6.

FIG. 8 is a diagram illustrating an example of data formats to be used in a case where the node in FIG. 2 acquires system time information.

FIG. 9 is a diagram illustrating an example of a request for acquiring system time information and its response in the data formats illustrated in FIG. 8.

DESCRIPTION OF EMBODIMENTS

A method may be proposed in which a destination to which an interrupt is to be issued based on an error occurring in a redundant computer system is switchable according to the degree of influence on the system). A method may be proposed in which a virtual baseboard management controller (BMC) emulated by a virtual server blade is caused to behave like a physical BMC, and to execute processing such as logging of events and errors in the virtual BMC. There may be proposed a method of improving the reliability of an operating system (OS) by providing a BMC with a function of selectively switching a disk device for activating the OS.

For example, a node such as a server and a control device including a BMC that controls the node communicate commands and data strings by using a keyboard controller style (KCS) interface in an Intelligent Platform Management Interface (IPMI) standard. When the node transmits a command and a data string to the BMC, the node transmits the data string following the command to a reception circuit of the control device on a byte-by-byte basis. The reception circuit issues an interrupt to the BMC every time a data piece of 1 byte is received from the node. The firmware of the BMC processes the data piece that the control device receives from the node in response to the interrupt.

For example, when the BMC controls a plurality of nodes, an increase in the number of nodes to be controlled by the BMC results in increases in the frequency of interrupt receptions and the frequency of interrupt processing executions by the BMC, thereby leading to an increase in the load on the BMC.

In one aspect, a reduction in the number of interrupts that a control device that controls a plurality of nodes issues based on data pieces received from the nodes may be provided.

Figure 1:
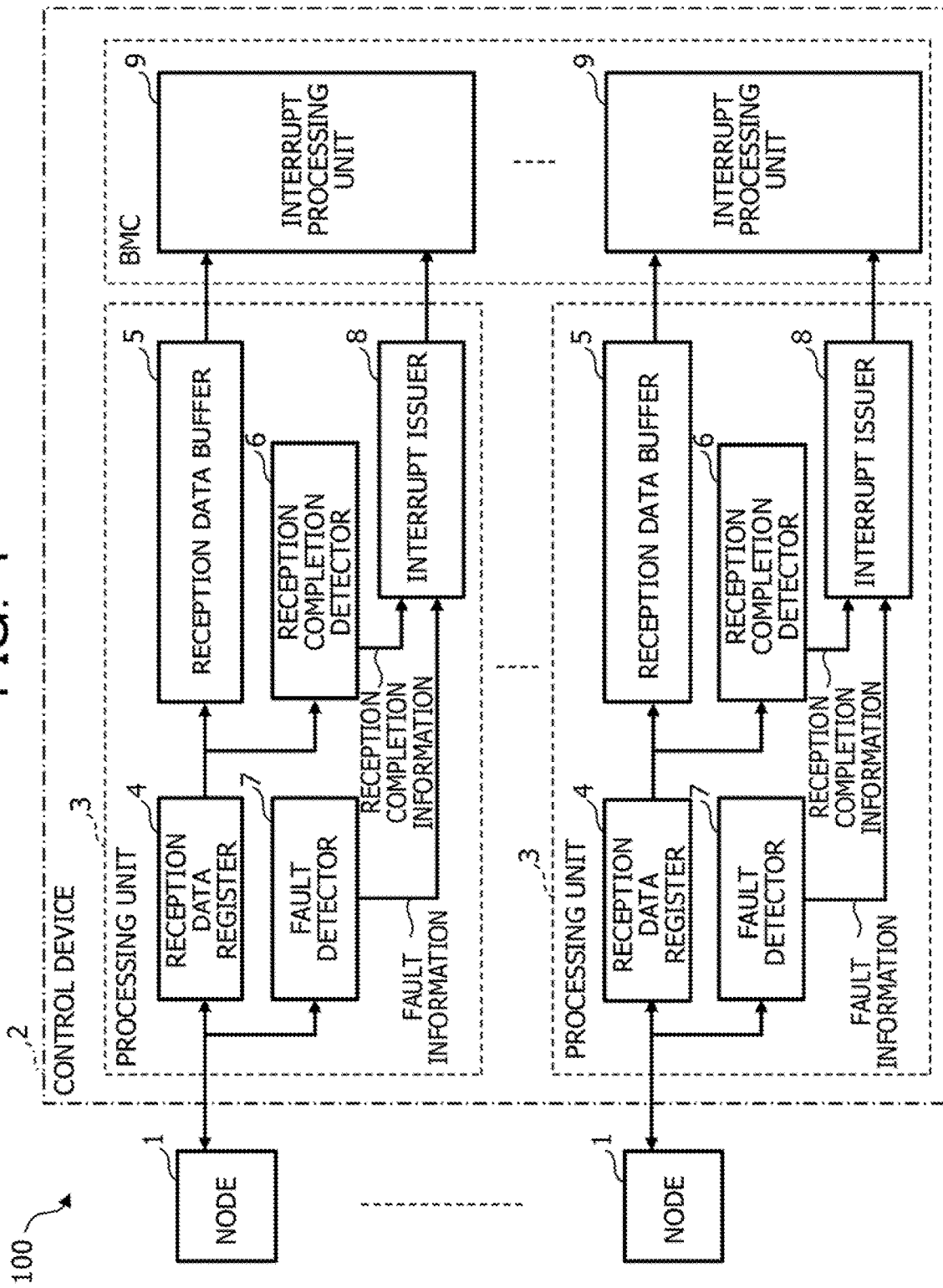
FIG. 1 is a block diagram illustrating an example of a parallel processing apparatus according to an embodiment.

Hereinafter, the embodiments are described using the drawings. FIG. 1 illustrates an example of a parallel processing apparatus according to an embodiment. A parallel processing apparatus 100 illustrated in FIG. 1 includes a plurality of nodes 1 that execute information processing, and a control device 2 that controls the plurality of nodes 1. For example, each node 1 may be an information processing apparatus such as a server or a processor such as a central processing unit (CPU). Alternatively, each node 1 may be one of CPU cores included in a CPU. The nodes 1 may be coupled to each other via a network not illustrated, and transfer data to be used for the information processing to each other.

For example, the node 1 transmits a command and a data string following the command to the control device 2. For example, when the command is a notification command indicating a notification of a node status, the data string following the command indicates which operation status the node is in or a stopped status of the node. For example, when the command is a request command indicating a request for system information such as a time or a fault command indicating a fault status of the node 1, only the command may be transmitted without having any following data string. The fault status of the node 1 includes a case where the node 1 detects that the node 1 is disabled from normally communicating with the control device 2.

The control device 2 includes a plurality of processing units 3 provided corresponding to the respective nodes 1. Each processing unit 3 includes a reception data register 4, a reception data buffer 5, a reception completion detector 6, a fault detector 7, and an interrupt issuer 8. The control device 2 also includes interrupt processing units 9 provided corresponding to the respective nodes 1.

For example, the processing unit 3 is implemented by hardware, and the interrupt processing unit 9 is implemented by firmware executed by a controller such as a BMC mounted in the control device 2. A part of the processing unit 3 may be implemented by software, and the interrupt processing unit 9 may be implemented by hardware such as a field-programmable gate array (FPGA).

The reception data register 4 sequentially stores each of data pieces included in a data string following a command received from the corresponding node 1. Every time a data piece is stored into the reception data register 4, the data piece is transferred from the reception data register 4 to the reception data buffer 5. For example, the reception data register 4 has a size of 1 byte, and the reception data buffer 5 has a size (plural bytes) equal to or larger than the maximum size of a data string to be received from the node 1. Every time a data piece is written into the reception data register 4, the processing unit 3 transfers the written data piece to the reception data buffer 5. The data string following the command may be of 1 byte.

The reception completion detector 6 detects that the entire received data string following the command is transferred on a byte-by-byte basis from the reception data register 4 to the reception data buffer 5. For example, based on completion of the transfer of the data string to the reception data buffer 5, the reception completion detector 6 outputs reception completion information indicating completion of reception of the data string from the node 1 to the interrupt issuer 8.

The fault detector 7 detects whether or not the received command is a fault command indicating a fault status of the node 1 that transmitted the command. Based on the detection of the fault command, the fault detector 7 immediately outputs fault information indicating the fault status of the node 1 to the interrupt issuer 8.

The interrupt issuer 8 immediately issues an interrupt to the interrupt processing unit 9 based on the detection of the fault command by the fault detector 7. When the fault detector 7 does not detect the fault command, the interrupt issuer 8 issues an interrupt to the interrupt processing unit 9 based on the detection of the completion of transfer of the data string to the reception data buffer 5 by the reception completion detector 6.

The interrupt processing unit 9 executes interrupt processing based on the interrupt issued by the interrupt issuer 8. Here, the interrupt processing varies depending on a cause of the interrupt. For example, in interrupt processing based on reception of the data string following a notification command indicating the notification of the node status, the interrupt processing unit 9 stores the status of the node indicated by the data string into a status storage area in the BMC, and issues a response command indicating the reception of the data string to the node. For example, in interrupt processing based on reception of a request command indicating a request for system information such as a time, the interrupt processing unit 9 acquires the system information such as the time, and returns the acquired system information to the node 1. For example, in interruption processing based on reception of a fault command indicating a fault status of the node 1, the interrupt processing unit 9 analyzes the details and cause of the fault, and notifies the node 1 or an administrator's terminal of the details and cause of the fault.

In the parallel processing apparatus 100 illustrated in FIG. 1, the reception completion detector 6 outputs reception completion information to the interrupt issuer 8 based on the completion of the transfer of the data string received from the node 1 following the notification command to the reception data buffer 5. This makes it possible to reduce the number of interrupts issued to the interrupt processing unit 9 by the interrupt issuer 8 as compared to the case where the reception completion information is outputted to the interrupt issuer 8 every time the reception data register 4 receives a data piece included in the data string. This also makes it possible to reduce the number of interrupt processing executions based on interrupts and accordingly reduce the load applied to the MC (the interrupt processing units 9). As a result, the control device 2 is enabled to control a larger number of nodes 1. For example, as compared with the case where an interrupt is issued every time a data piece of 1 byte transmitted following the command from the node 1 is received, the number of control devices 2 arranged in the parallel processing apparatus 100 may be reduced and the cost for the parallel processing apparatus 100 may be accordingly reduced.

When a fault command is received, the fault information is immediately outputted to the interrupt issuer 8 and the interrupt issuer 8 issues an interrupt to the interrupt processing unit 9, so that the interrupt processing for the fault status of the node 1 may be quickly started.

Figure 2:
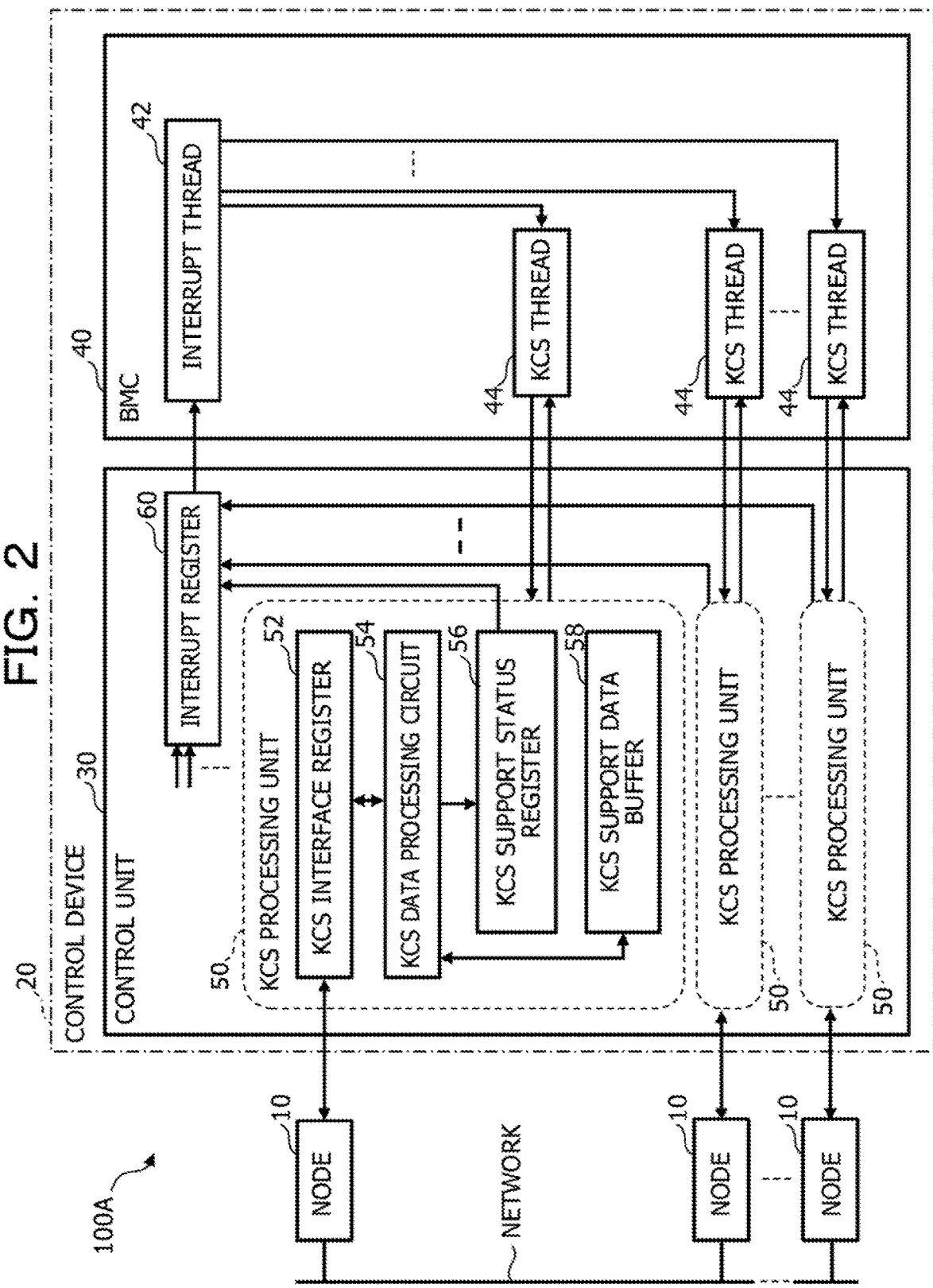
FIG. 2 is a block diagram illustrating an example of a parallel processing apparatus according to another embodiment.

FIG. 2 illustrates an example of a parallel processing apparatus according to another embodiment. Constituent elements similar to or same as those illustrated in FIG. 1 are not described in details. A parallel processing apparatus 100A illustrated in FIG. 2 includes a plurality of nodes 10 that execute information processing, and a control device 20 that controls and manages the plurality of nodes 10. For example, the nodes 10 are coupled to each other via a network. Each node 10 may be an information processing apparatus such as a server, a processor such as a CPU, or one of CPU cores included in a CPU.

The control device 20 includes a control unit 30 and a BMC 40. The control unit 30 is implemented by hardware, for example, and controls the transmission and reception of commands and data strings following the commands to and from each node 10. For example, the nodes 10 and the control unit 30 transmit and receive commands and data strings by using a KCS interface in the IPMI standard. FIG. 2 illustrates constituent elements for commands and data received from the nodes 10, and omits illustration of constituent elements for commands and data to be transmitted to the nodes 10.

Figure 3:
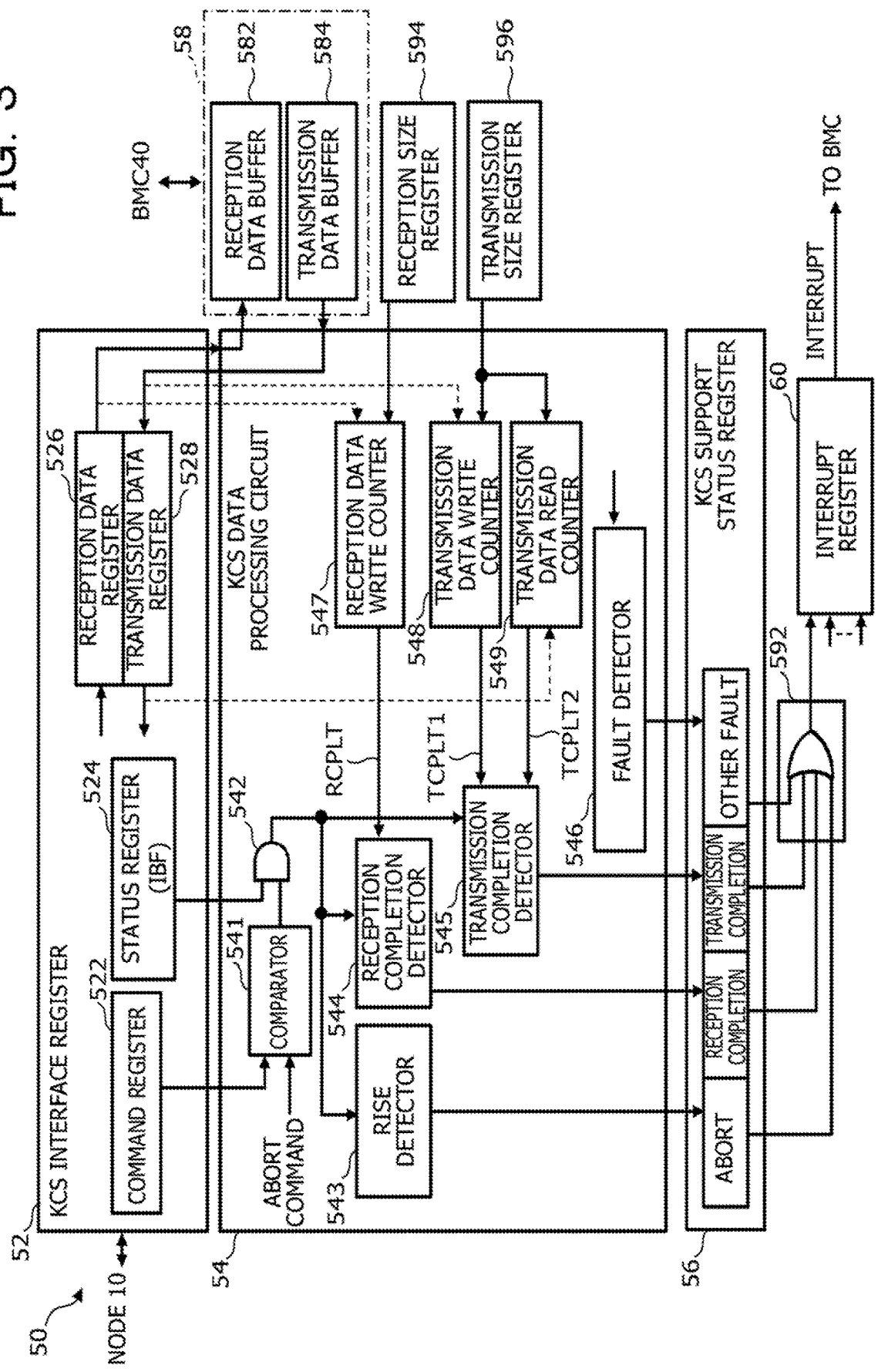
FIG. 3 is a block diagram illustrating an example of a KCS processing unit in FIG. 2.

The control unit 30 includes a plurality of KCS processing units 50 provided corresponding to the respective nodes 10 and an interrupt register 60. Each KCS processing unit 50 includes a KCS interface register 52, a KCS data processing circuit 54, a KCS support status register 56, and a KCS support data buffer 58. An example of the KCS processing unit 50 is illustrated in FIG. 3. The KCS processing unit 50 is an example of a processing unit.

The KCS interface register 52 holds a data string following a command received from the node 10 and holds a data string to be transmitted together with a command to the node 10. When the KCS data processing circuit 54 determines to issue a KCS interrupt based on reception of a data string by the KCS interface register 52, the KCS data processing circuit 54 sets a predetermined KCS interrupt flag in the KCS support status register 56. Here, the KCS interrupt is an interrupt generated due to communication using the KCS interface from the node 10 to the control device 20.

The KCS support data buffer 58 holds, as a data string, data pieces received on the byte-by-byte basis from the node 10 through the KCS interface register 52. The KCS support data buffer 58 holds a data string including data pieces to be transmitted on the byte-by-byte basis to the node 10 through the KCS interface register 52.

The BMC 40 executes management of each node 10 such as control of a power supply, acquisition of temperature information and others, and logging of events in the node 10, and also executes KCS interrupt processing based on a KCS interrupt issued from the control unit 30. The KCS interrupt processing is interrupt processing executed based on a KCS interrupt. FIG. 2 only illustrates the constituent elements for the KCS interrupt processing, and omits illustration of constituent elements for the management of the nodes 10.

The BMC 40 executes, by firmware, an interrupt thread 42 and a KCS thread 44 for each node 10 activated by the interrupt thread 42 when a KCS interrupt occurs. For example, the KCS thread 44 is an example of an interrupt processing unit that executes the KCS interrupt processing based on an interrupt from the corresponding KCS processing unit 50, and generates response data to be transmitted to the corresponding node 10. The KCS thread 44 ends when the KCS interrupt processing based on the KCS interrupt is completed. The BMC 40 may include an interrupt processing circuit that executes the interrupt processing instead of either or both of the interrupt thread 42 and the KCS thread 44.

FIG. 3 illustrates an example of the KCS processing unit 50 illustrated in FIG. 2. The KCS interface register 52 includes a command register 522, a status register 524, a reception data register 526, and a transmission data register 528. For example, each of the command register 522, the status register 524, the reception data register 526, and the transmission data register 528 is of 1 byte.

The KCS data processing circuit 54 includes a comparator 541, an AND section 542, a rise detector 543, a reception completion detector 544, a transmission completion detector 545, and an other fault detector 546. The KCS data processing circuit 54 also includes a reception data write counter 547, a transmission data write counter 548, and a transmission data read counter 549.

The KCS support status register 56 has, as KCS interrupt flags, an abort flag, a reception completion flag, a transmission completion flag, and an other fault flag. The KCS processing unit 50 includes an interrupt issuance controller 592 that issues an interrupt to the interrupt register 60 based on the abort flag, the reception completion flag, the transmission completion flag, or the other fault flag.

The KCS support data buffer 58 includes a reception data buffer 582 and a transmission data buffer 584. The KCS processing unit 50 also includes a reception size register 594 and a transmission size register 596. The KCS support status register 56 and the interrupt issuance controller 592 are an example of an interrupt issuer that issues a KCS interrupt based on detection of a fault command or detection of completion of transfer of a reception data string or a transmission data string when a fault command is not detected.

The command register 522 holds a command transmitted from the node 10. The reception data register 526 holds each data piece included in the data string following the command received from the corresponding node 10, for example, on a byte-by-byte basis. For example, the node 10 writes the command in the command register 522, and writes each data piece of 1 byte in the reception data register 526. The data string received from the node 10 is an example of a reception data string. Every time a data piece of 1 byte in the data string received from the node 10 is held in the reception data register 526, the data piece is transferred from the reception data register 526 to the reception data buffer 582.

The status register 524 has an input buffer full (IBF) flag according to the IPMI specifications. The IBF flag in the status register 524 is set to "1" when a command is written into the command register 522 by the node 10 or when a data piece is written into the reception data register 526 by the node 10.

The transmission data register 528 holds a data piece of 1 byte to be transmitted to the rode 10. The data piece held in the transmission data register 528 is transferred from the transmission data buffer 584 based on control by the KCS data processing circuit 54.

For example, the BMC 40 (the KCS thread 44 in FIG. 2) performs KCS interrupt processing of processing the data string transferred to the reception data buffer 582, generates a data string to be returned to the corresponding node 10, and stores the generated data string in the transmission data buffer 584. Then, the data pieces transferred from the transmission data buffer 584 to the transmission data register 528 sequentially on the byte-by-byte basis are transmitted to the corresponding node 10 as a response data string.

The comparator 541 compares the command held in the command register 522 with an abort command. The comparator 541 outputs "1" when the command held in the command register 522 is the abort command, or outputs "0" when the command held in the command register 522 is not the abort command. For example, the command register 522 stores command codes for identifying commands, and the comparator 541 compares the command code held in the command register 522 with the command code for identifying the abort command. The abort command is an example of a fault command indicating a fault status of the node 10.

The AND section 542 outputs "1" when the IBF flag is set to "1" and the comparator 541 outputs "1" or outputs "0" when the IBF flag is set to "0" or the comparator 541 outputs "0". When detecting that the output of the AND section 542 has changed from "0" to "1", the rise detector 543 sets the abort flag. The comparator 541 and the AND section 542 are an example of a fault detector that detects whether a command received from the corresponding node 10 is a fault command indicating a fault status of the node 10.

When a reception completion signal RCPLT indicating completion of transfer of the data string received from the node 10 to the reception data buffer 582 is received from the reception data write counter 547, the reception completion detector 544 sets the reception completion flag in the KCS support status register 56. However, in the case where the reception completion detector 544 has received "1" from the AND section 542, the reception completion detector 544 suspends the operation of setting the reception completion flag, and thereby stops an interrupt from being issued in response to the reception completion signal RCPLT. When the abort command is received from the node 10, there is a possibility that the node 10 may have a fault in operation, and the data string received from the node 10 may be incorrect. Therefore, when the abort command is received, the issuance of an interrupt in response to the completion of reception of the reception data string is stopped, thereby keeping the BMC 40 from executing unnecessary interrupt processing.

When the transmission completion detector 545 receives both transmission completion signals TCPLT1 and TCPLT2 from the transmission data write counter 548 and the transmission data read counter 549, the transmission completion detector 545 detects completion of transmission of a response data string to the node 10. Then, the transmission completion detector 545 sets the transmission completion flag in the KCS support status register 56.

However, in the case where the transmission completion detector 545 has received "1" from the AND section 542, the transmission completion detector 545 suspends the operation of setting the transmission completion flag, and thereby stops an interrupt from being issued in response to the transmission completion signals TCPLT1 and the TCPLT2. When the abort command is received from the node 10, there is a possibility that the node 10 may have a fault in operation, and the node 10 may fail to correctly receive the data string transmitted from the control device 20. Therefore, when the abort command is received, the issuance of an interrupt in response to the completion of transmission of the transmission data string is stopped, thereby keeping the BMC 40 from executing unnecessary interrupt processing.

When a fault in communication with the node 10 or the like is detected in the control device 20, the other fault detector 546 sets the other fault flag regardless of the abort command from the node 10. For example, the other fault flag is set when a timeout occurs before a reception data string in a reception data size is completely received, when a timeout occurs before a transmission data string in a transmission data size is completely transmitted, or the like.

The reception data write counter 547 updates the counter value every time a data piece included in the data string received together with the command from the node 10 is written from the reception data register 526 to the reception data buffer 582. When the counter value becomes equal to the reception data size held in the reception size register 594, the reception data write counter 547 outputs the reception completion signal RCPLT to the reception completion detector 544. For example, the reception data write counter 547 monitors a write request generated when a data piece is written from the reception data register 526 to the reception data buffer 582, and updates the counter value every time the write request is generated. The reception data write counter 547 is an example of a reception data counter.

The reception data write counter 547 counts every data piece written into the reception data buffer 582 one by one, which makes it possible to issue an interrupt in response to the completion of transfer of the reception data string to the reception data buffer 582. This also makes it possible to stop an interrupt from being issued before the transfer of the reception data string to the reception data buffer 582 is completed, and to issue the interrupt without taking a time from the completion of the transfer of the reception data string to the reception data buffer 582. Therefore, when the interrupt is issued based on the completion of the transfer of the reception data string, it is possible to suppress a decrease in the efficiency of the interrupt processing.

The transmission data write counter 548 updates the counter value every time a data piece is written into the transmission data register 528 from the transmission data buffer 584. When the counter value becomes equal to the transmission data size held in the transmission size register 596, the transmission data write counter 548 outputs the transmission completion signal TCPLT1 to the transmission completion detector 545.

For example, when the counter value is updated a number of times that is equal to the number of data pieces in a response data string, the transmission data write counter 548 outputs the transmission completion signal TCPLT1. For example, the transmission data write counter 548 monitors a write request generated when a data piece is written from the transmission data buffer 584 to the transmission data register 528, and updates the counter value every time the write request is generated. The transmission data write counter 548 is an example of a first transmission data counter, and the transmission completion signal TCPLT1 is an example of a first transmission completion signal.

The transmission data read counter 549 updates the counter value every time a data piece stored in the transmission data register 528 is read out by the node 10. When the counter value becomes equal to the transmission data size held in the transmission size register 596, the transmission data read counter 549 outputs the transmission completion signal TCPLT2 to the transmission completion detector 545.

For example, when the counter value is updated a number of times that is equal to the number of data pieces in the response data string, the transmission data read counter 549 outputs the transmission completion signal TCPLT2. For example, the transmission data read counter 549 monitors a read request issued when the node 10 reads out a data piece from the transmission data register 528, and updates the counter value every time the read request is generated. The transmission data read counter 549 is an example of a second transmission data counter, and the transmission completion signal TCPLT2 is an example of a second transmission completion signal.

The transmission data write counter 548 and the transmission data read counter 549 each count every data piece included in the transmission data string one by one, which makes it possible to issue an interrupt in response to the completion of transmission of the transmission data string to the node 10. This also makes it possible to stop an interrupt from being issued during the transmission of the transmission data string to the node 10, and to issue the interrupt without taking a time from the completion of the transmission of the transmission data string to the node 10. Therefore, when the interrupt is issued based on the completion of the transmission of the transmission data string, it is possible to suppress a decrease in the efficiency of the interrupt processing.

Further, since the interrupt is issued based on the counts of the data pieces by both the transmission data write counter 548 and the transmission data read counter 549, the reliability of the issuance of the interrupt may be improved.

The reception data write counter 547 may determine the completion of reception of a data string without using the reception size register 594. For example, the K data processing circuit 54 obtains the size of the reception data string (reception data size) following the command based on the command received from the node 10, and sets the obtained reception data size in the reception data write counter 547. The reception data write counter 547 decrements the counter value every time a data piece is written from the reception data register 526 to the reception data buffer 582, and outputs the reception completion signal RCPLT when the counter value becomes equal to "0".

The transmission data write counter 548 and the transmission data read counter 549 may determine the completion of transmission of a data string without using the transmission size register 596. For example, the KCS data processing circuit 54 sets the size (transmission data size) of the data string to be transmitted to the node 10 following the command, in the transmission data write counter 548 and the transmission data read counter 549. The transmission data write counter 548 decrements the counter value every time a data piece is written from the transmission data buffer 584 to the transmission data register 528, and outputs the transmission completion signal TCPLT1 when the counter value becomes equal to "0", The transmission data read counter 549 decrements the counter value every time a data piece stored in the transmission data register 528 is read out by the node 10, and outputs the transmission completion signal TCPLT2 when the counter value becomes equal to "0".

The interrupt issuance controller 592 issues a KCS interrupt to the interrupt register 60 in response to the setting of any of the abort flag, the reception completion flag, the transmission completion flag, and the other fault flag. When receiving the KCS interrupt, the interrupt register 60 notifies the interrupt thread 42 in the BMC 40 of the KCS interrupt.

The priority order for issuing the KCS interrupt may be set such that a higher priority is given to the abort flag and the other fault flag than that to the reception completion flag and the transmission completion flag. In this case, when the abort flag is set and the interrupt processing for the abort flag is executed, an interrupt to be issued in response to the reception completion flag or the transmission completion flag is masked. On the other hand, even in the case where the reception completion flag is set and the interrupt processing for the reception completion flag is executed, an interrupt is issued to the interrupt register 60 when the abort flag or the other fault flag is set.

For example, in the case where the reception completion flag is set again during execution of the interrupt processing in response to the setting of the reception completion flag, an interrupt to be issued for the reception completion flag set again is masked. In this manner, the interrupt issuance controller 592 has a function of masking an interrupt to be issued.

The reception data buffer 582 holds data pieces transferred from the reception data register 526. The data string (reception data) held in the reception data buffer 582 is read out by the BMC 40. For example, the reception data buffer 582 is of a size (of plural bytes) equal to or greater than the maximum size of a reception data string to be received from the node 10.

A data string is written to the transmission data buffer 584 by the BMC 40. The data string (transmission data) held in the transmission data buffer 584 is transferred to the transmission data register 528 and is read out by the node 10 on the byte-by-byte basis. For example, the transmission data buffer 584 is of a size (of plural bytes) equal to or greater than the maximum size of a transmission data string to be transmitted to the node 10.

The reception size register 594 stores the reception data size which is the size of a data string transmitted together with a command from the node 10. The transmission size register 596 stores the transmission data size which is the size of a data string to be transmitted together with a command to the node 10.

FIG. 4 presents an example of commands to be written to the command register 522 in FIG. 3. The commands presented in FIG. 4 are substantially the same as KCS control codes according to the IPMI specifications. For example, in the case of transferring data pieces to the control device 20, the node 10 writes WRITE_START (command code=61h) in the command register 522 to start the transaction, and then writes the data pieces into the reception data register 526 on the byte-by-byte basis. Note that "h" at the end of the command code indicates that the command code is a hexadecimal number. Then, after writing the last data piece into the reception data register 526, the node 10 writes WRITE_END (command code=62h) in the command register 522, and terminates the transaction.

When the node 10 detects a communication fault or the like in a period from writing of WRITE_START to writing of WRITE_END in the command register 522, the node 10 writes ABORT (abort command; command code=60h) into the command register 522. The control device 20 which has received the abort command executes abort processing to be described later. For example, all the command codes have 1 byte.

FIG. 5 illustrates an example of data formats stored in the reception data register 526 and the transmission data register 528 in FIG. 3. A request data format illustrated in FIG. 5 is substantially the same as the request message format according to the IPMI specifications. A response data format illustrated in FIG. 5 is substantially the same as the response message format according to the IPMI specifications.

The request data format of a request to be written into the reception data register 526 from the node 10 includes a network function code NetFn/logical unit number (LUN) of 1 byte, a command Cmd of 1 byte, and data Data of 0 or more bytes. The response data format of a response to be written into the transmission data register 528 from the BMC 40 includes NetFn/LUN of 1 byte, Cmd of 1 byte, Completion Code of 1 byte, and data Data of 0 or more bytes.

FIG. 6 illustrates an example of data formats to be used in the case where the node 10 in FIG. 2 makes a notification of the operation status. For example, in the case of making a notification of the operation status, the node 10 sets the NetFn/LUN to 30h, sets the Cmd to 00h, sets the code indicating the operation status in Data at Byte 3, and sets the additional information in Data at Byte 4, Bytes 5 and 6 in Data are reserved areas. In the example illustrated in FIG. 6, the node 10 is able to make a notification of any of eight kinds of operation statuses according to Data at Byte 3. Further the node 10 is able to notify whether the shutdown is normal shutdown or anomalous shutdown by using the additional information at Byte 4.

The BMC 40, which has received the notification of the operation status, creates a response in which NetFn/LUN and Cmd are respectively set to 30h and 00h that are the same as those in the request, and Completion Code at Byte 3 is set to 00h indicating normal termination in the case of the response indicating normal termination. In the response to the notification of the operation status, the Data Field is not used.

FIG. 7 illustrates an example of request data for a notification of the operation status of a node and its response data in the data formats illustrated in FIG. 6. For example, when the node 10 notifies the BMC 40 that the OS of the node 10 is in an active status, 0Ah is written following 30h and 00h for NetFn/LUN and Cmd in the reception data register 526. The contents written in the response data are the same as those illustrated in FIG. 6.

FIG. 8 illustrates an example of data formats in the case where the node 10 in FIG. 2 acquires system time information. For example, in the case of acquiring the system time information, the node 10 sets NetFn/LUN to 31h and sets Cmd to 01h. Data at Bytes 3 and later does not exist.

The BMC 40, which has received the notification of the acquisition of the system time information, creates a response in which NetFn/LUN and Cmd are set to 31h and 01h that are the same as in the request, and Completion Code at Byte 3 is set to 00h indicating normal termination in the case of the response indicating normal termination. In addition, data indicating the system time is set at four bytes from Byte 4 to Byte 7. For example, the system time is presented as cumulative seconds since Jan. 1, 1970 in a Coordinated Universal Time (UTC).

FIG. 9 illustrates an example of a request for acquiring system time information and its response in the data formats illustrated in FIG. 8. The contents written in the request data are the same as those illustrated in FIG. 8. In the response data, first 3 bytes are the same as those illustrated in FIG. 8. For example, at Bytes 4 to 7 in the response data, 5ch, bdh, 85h, and e5h indicating the system time are written respectively.

Figure 10:
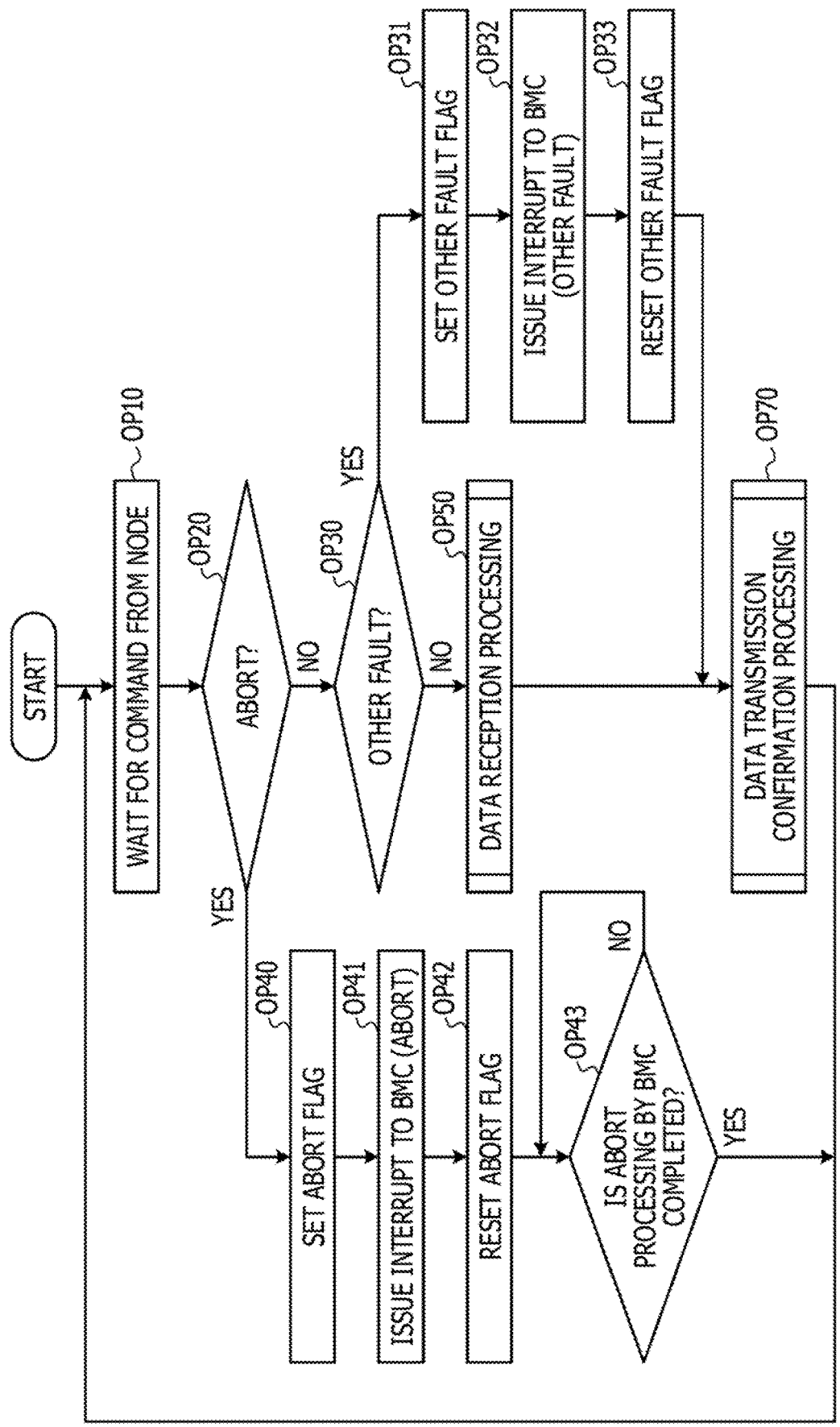
FIG. 10 is a flowchart presenting an example of operations by the KCS processing unit in FIG. 2.

FIG. 10 illustrates an example of operations of the KCS processing unit 50 illustrated in FIG. 3. First, the KCS processing unit 50 waits for a command from the node 10 at operation OP10 and shifts to operation OP20 when receiving a command from the node 10. At operation OP20, the KCS data processing circuit 54 determines whether or not the command is the abort command by using the comparator 541.

When the command is the abort command, the operation is shifted to operation OP40, and the abort processing is performed as described below. After the completion of the abort processing, the operation is returned to command waiting at operation OP10.

At operation OP40, the rise detector 543 sets the abort flag in the KCS support status register 56. Next, at operation OP41, the interrupt issuance controller 592 sets an interrupt request in the interrupt register 60 in response to the setting of the abort flag, thereby issuing an interrupt to the BMC 40. The operation is shifted to operation OP42.

At operation OP42, for example, the interrupt issuance controller 592 resets the abort flag based on the issuance of the interrupt to the interrupt register 60. Next, at operation OP43, the KCS data processing circuit 54 waits for completion of the abort processing by the BMC 40. The operation returns to operation OP10 when the abort processing is completed.

On the other hand, when the command is not the abort command at operation OP20, the operation is shifted to operation OP30, in which the KCS data processing circuit 54 determines whether or not another fault has occurred. When another fault has occurred, the other fault detector 546 sets the other fault flag in the KCS support status register 56 at operation OP31. Next, at operation OP32, the interrupt issuance controller 592 sets an interrupt request to the interrupt register 60 in response to the setting of the other fault flag, thereby issuing an interrupt to the BMC 40. Next, at operation OP33, for example, the interrupt issuance controller 592 resets the other fault flag based on the issuance of the interrupt to the interrupt register 60. The operation is then shifted to operation OP70.

Meanwhile, when neither the abort nor another fault has occurred, the KCS data processing circuit 54 executes the reception processing of the data string from the node 10 at operation OP50. The operation is shifted to operation OP70 after the completion of the reception processing of the data string. An example of operations at operation OP50 is illustrated in FIG. 11.

Figure 12:
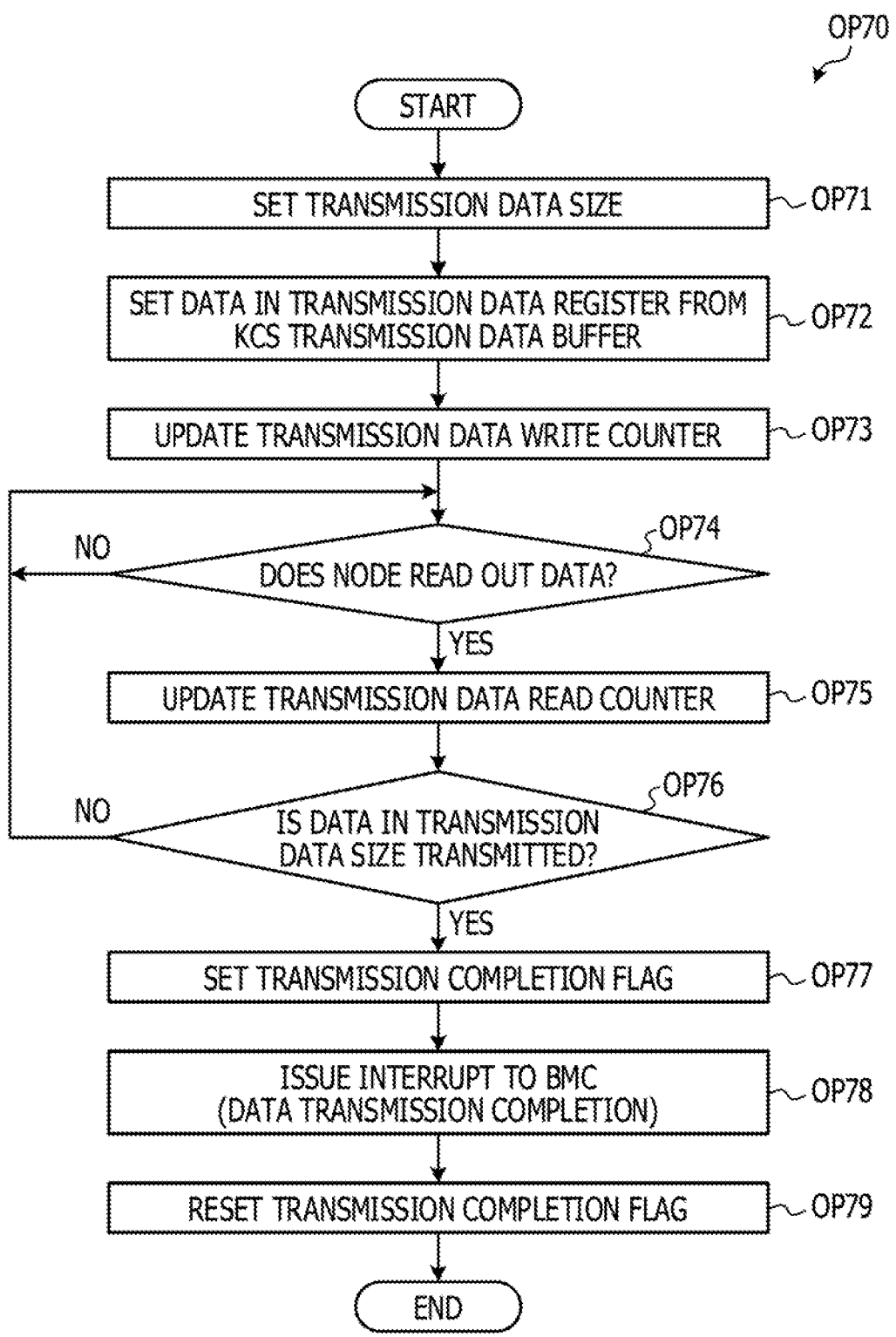
FIG. 12 is a flowchart presenting an example of processing at operation OP70 in FIG. 10.

At operation OP70, the KCS data processing circuit 54 executes transmission confirmation processing of the response data transmitted to the node 10 based on the completion of the interrupt processing, and then returns to command waiting at operation OP10. An example of operations at operation OP70 is illustrated in FIG. 12.

Figure 11:
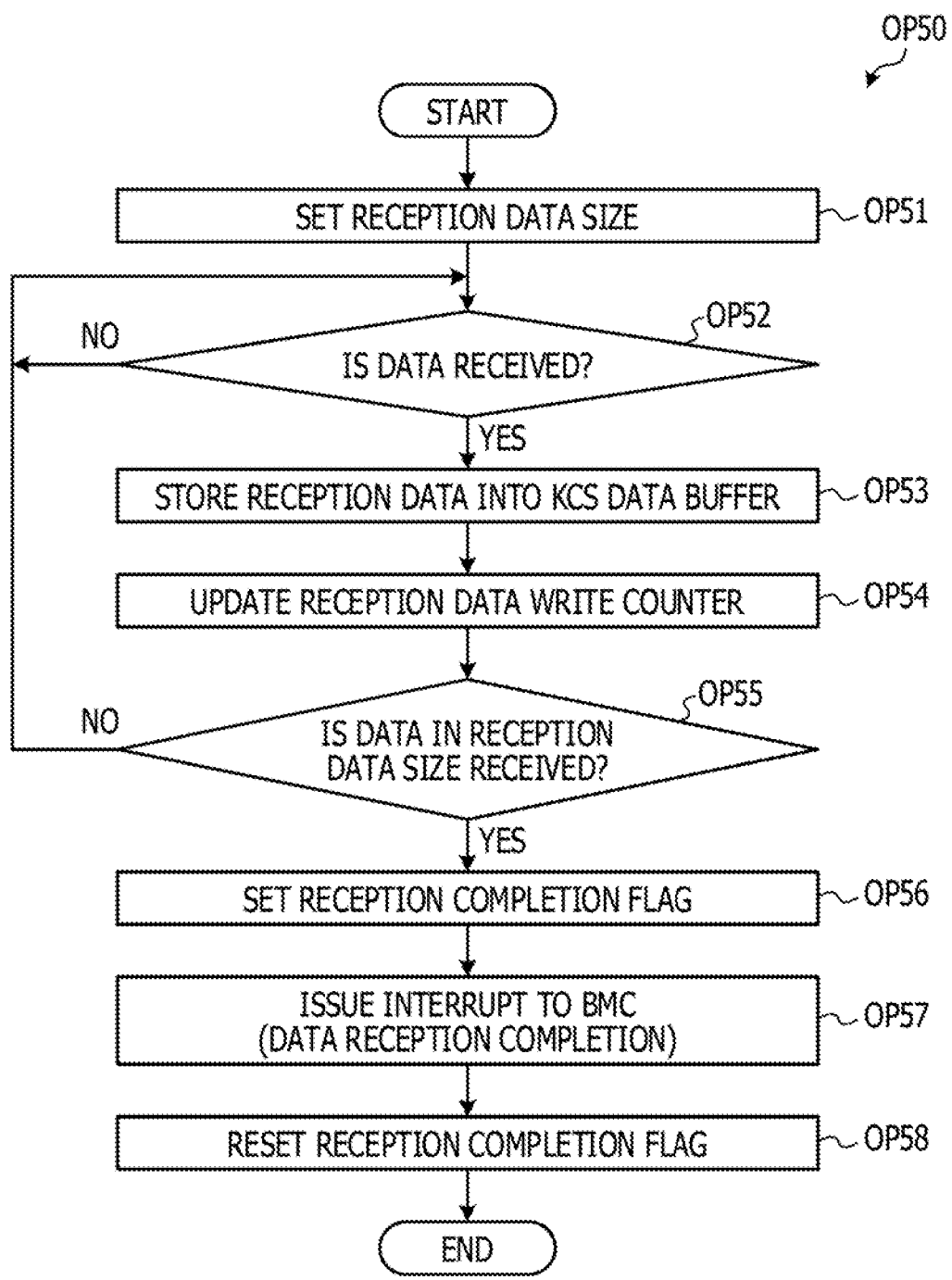
FIG. 11 is a flowchart presenting an example of processing at operation OP50 in FIG. 10.

FIG. 11 illustrates an example of operation OP50 in FIG. 10. First, at operation OP51, the KCS processing unit 50 sets the reception data size in the reception size register 594. Next, at operation OP52, the KCS processing unit 50 waits for a data piece from the node 10 to be stored in the reception data register 526. When a data piece is stored in the reception data register 526, the KCS processing unit 50 stores the data piece held in the reception data register 526 into the reception data buffer 582 at operation OP53. Next, at operation OP54, the KCS data processing circuit 54 updates the counter value of the reception data write counter 547.

Next, at operation OP55, the KCS data processing circuit 54 determines whether or not the data string in the reception data size is already received from the node 10 based on the counter value of the reception data write counter 547. When the data string in the reception data size is not received from the node 10, the KCS processing unit 50 waits for the next data piece to be received at operation OP52. When the data string in the reception data size is already received from the node 10, the reception completion detector 544 sets the reception completion flag in the KCS support status register 56 at operation OP56.

Next, at operation OP57, the interrupt issuance controller 592 sets an interrupt request to the interrupt register 60 in response to the setting of the reception completion flag, thereby issuing an interrupt to the BMC 40. Next, at operation OP58, for example, the interrupt issuance controller 592 resets the reception completion flag based on the issuance of the interrupt to the interrupt register 60, and shifts the operation to operation OP70 illustrated in FIG. 10.

FIG. 12 illustrates an example of operation OP70 in FIG. 10. First, at operation OP71, the KCS processing unit 50 sets the transmission data size in the transmission size register 596. Next, at operation OP72, the KCS data processing circuit 54 sets a data piece of 1 byte out of the data string held in the transmission data buffer 584 into the transmission data register 528. Next, the KCS data processing circuit 54 updates the counter value of the transmission data write counter 548.

Next, at operation OP73, the KCS data processing circuit 54 waits for the node 10 to read out the data piece held in the transmission data register 528. When the node 10 reads out the data piece, the KCS data processing circuit 54 updates the counter value of the transmission data read counter 549 at operation OP75.

Next, at operation OP76, the KCS data processing circuit 54 determines whether or not the data string in the transmission data size is already transmitted to the rode 10 based on the counter value of the transmission data write counter 548 and the counter value of the transmission data read counter 549. When the data string in the transmission data size is not transmitted to the node 10, the operation returns to operation OP74. When the data string in the transmission data size is already transmitted to the node 10, the KCS data processing circuit 54 sets the transmission completion flag in the KCS support status register 56 at operation OP77.

Next, at operation OP78, the interrupt issuance controller 592 sets an interrupt request in the interrupt register 60 in response to the setting of the transmission completion flag, thereby issuing an interrupt to the BMC 40. Next, at operation OP79, for example, the interrupt issuance controller 592 resets the transmission completion flag based on the issuance of the interrupt to the BMC 40, and the operation returns to operation OP10 illustrated in FIG. 10.

Figure 13:
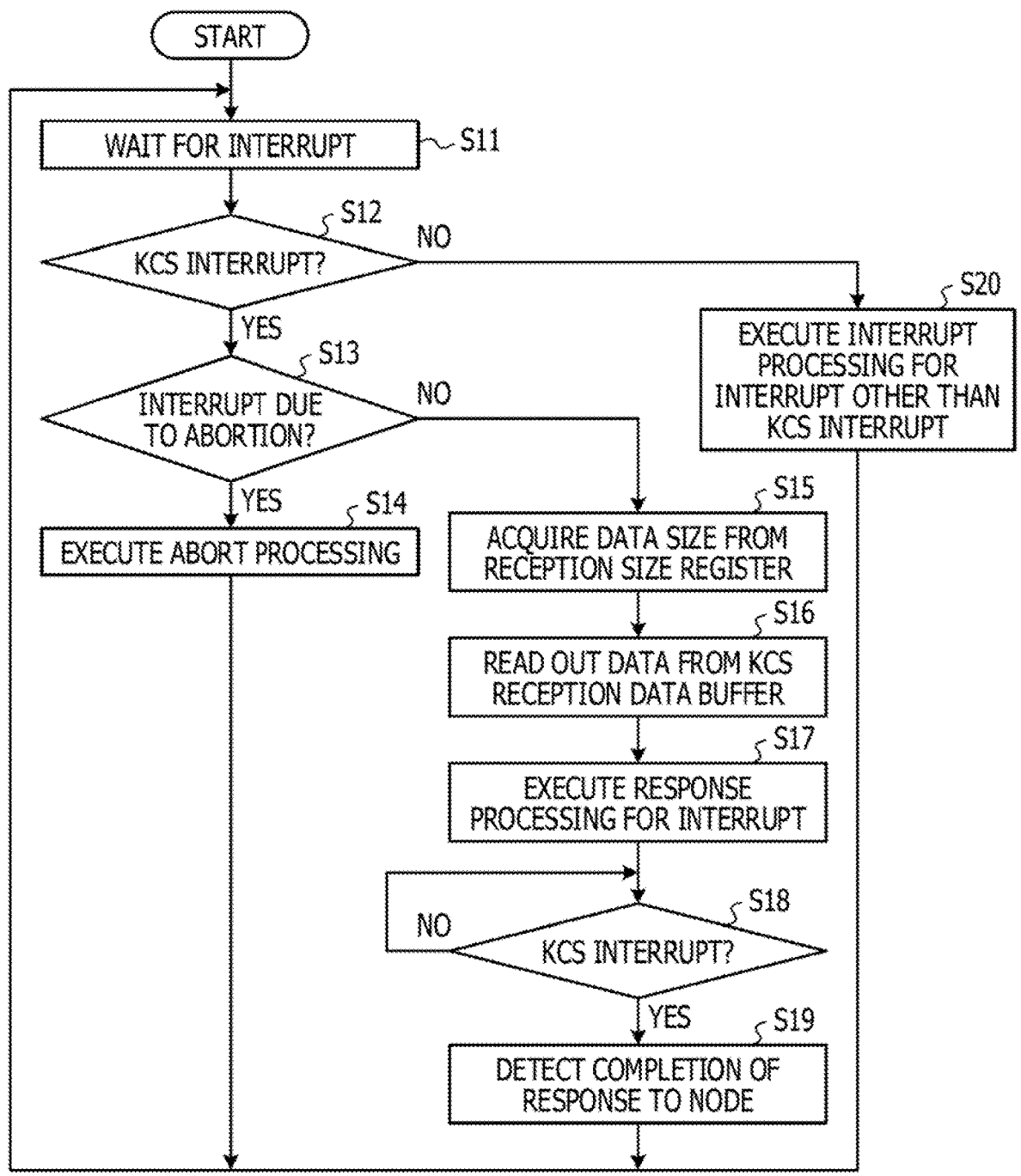
FIG. 13 is a flowchart presenting an example of KCS interrupt processing by a BMC in FIG. 2.

FIG. 13 illustrates an example of the KCS interrupt processing performed by the BMC 40 in FIG. 2. For example, the processing illustrated in FIG. 13 is executed by the firmware executed by the BMC 40.

First, at step S11, the BMC 40 waits for an interrupt from the control device 20 or the like. When receiving an interrupt, the BMC 40 determines whether or not the interrupt is a KCS interrupt at step S12, and shifts the processing to step S13 when the interrupt is the KCS interrupt, or shifts the processing to step S20 when the interrupt is not the KCS interrupt.

At step S13, the BMC 40 determines whether or not the KCS interrupt is an interrupt due to an abortion, and shifts the processing to step S14 when the KCS interrupt is the interrupt due to the abortion or shifts the processing to step S15 when the KCS interrupt is not the interrupt due to the abortion. At step S14, the BMC 40 executes abort processing which is processing for an interrupt due to an abortion, and returns the processing to step S11.

At step S15, the BMC 40 acquires the reception data size from the reception size register 594. Next, at step S16, the BMC 40 reads out the data string in the reception data size from the reception data buffer 582. Next, at step S17, the BMC 40 executes response processing for the interrupt. For example, in the response processing, the BMC 40 stores a transmission data string to be returned to the node 10 into the transmission data buffer 584.

Next, at step S18, the BMC 40 waits for the KCS interrupt to be issued based on the transmission of the data string stored in the transmission data buffer 584 to the node 10, and shifts the processing to step S19 when receiving the KCS interrupt. At step S19, the BMC 40 detects the completion of the response to the node 10 based on the reception of the KCS interrupt, and returns the processing to step S11. On the other hand, at step S20, the BMC 40 executes interrupt processing for the interrupt other than the KCS interrupt, and returns the processing to step S11.

Thus, the same effects as those of the embodiment illustrated in FIG. 1 may be also obtained according to the embodiment illustrated in FIGS. 2 to 13. For example, unless the abort command is received, the KCS processing unit 50 issues a KCS interrupt based on the transfer of a data string following a command to the reception data buffer 582. Therefore, the number of interrupts issued to the BMC 40 may be reduced as compared to the case where the KCS interrupt is issued every time the reception data register 526 receives a data piece in the data string. This makes it possible to reduce the number of interrupt processing executions based on interrupts, thereby reducing the load applied to the BMC 40. As a result, the control device 20 is enabled to control a larger number of nodes 1.

Furthermore, in the embodiment illustrated in FIGS. 2 to 13, it is possible to issue an interrupt along with the completion of transfer of the reception data string to the reception data buffer 582. This also makes it possible to stop an interrupt from being issued before the transfer of the reception data string to the reception data buffer 582 is completed, and to issue the interrupt without taking a time from the completion of the transfer of the reception data string to the reception data buffer 582. Therefore, when the interrupt is issued based on the completion of transfer of the reception data string, it is possible to suppress a decrease in the efficiency of the interrupt processing.

The transmission data write counter 548 and the transmission data read counter 549 each count every data piece included in the transmission data string one by one, which makes it possible to issue an interrupt in response to the completion of transmission of the transmission data string to the node 10. This also makes it possible to stop an interrupt from being issued during the transmission of the transmission data string to the node 10, and to issue the interrupt without taking a time from the completion of the transmission of the transmission data string to the node 10. Therefore, when the interrupt is issued based on the completion of the transmission of the transmission data string, it is possible to suppress a decrease in the efficiency of the interrupt processing.

When the abort command is received, the issuance of an interrupt in response to the completion of reception of a reception data string is stopped, thereby keeping the BMC 40 from executing unnecessary interrupt processing. When the abort command is received, the issuance of an interrupt in response to the completion of transmission of a transmission data string is stopped, thereby keeping the BMC 40 from executing unnecessary interrupt processing.

Features and advantages of the embodiments are clarified from the foregoing detailed description. The claims are intended to cover the features and advantages of the foregoing embodiments within a scope not departing from the spirit and scope of the claims. Any person having an ordinary knowledge in this technical field may easily find any improvements and changes. Therefore, there is no intention to limit the scope of the inventive embodiments to those described above, and it is possible to rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel processing apparatus comprising:
a plurality of nodes that execute information processing; and
a control device that controls the plurality of nodes, wherein
the control device includes
a plurality of processing units that are provided respectively corresponding to the plurality of nodes and that each process a command received from the corresponding node and a data string following the command,
each of the plurality of processing units includes
a reception data register in which data pieces in a reception data string following a command received from the corresponding node are stored sequentially piece by piece,
a reception data buffer to which every time a data piece is stored into the reception data register, the data piece is transferred from the reception data register,
a reception completion detector that detects completion of transfer of the reception data string to the reception data buffer,
a fault detector that detects whether the received command is a fault command indicating a fault status of the corresponding node, and
an interrupt issuer that issues an interrupt based on detection of the fault command by the fault detector, and issues an interrupt based on detection of the completion of the transfer of the reception data string by the reception completion detector when the fault detector does not detect the fault command, and
the control device further includes
interrupt processing units that are provided respectively corresponding to the plurality of nodes and each execute interrupt processing based on an interrupt issued by the corresponding interrupt issuer.

2. The parallel processing apparatus according to claim 1, wherein
each of the plurality of processing units includes
a reception data counter that updates a counter value every time a data piece is transferred from the reception data register to the reception data buffer, and outputs a reception completion signal when the counter value is updated a number of times that is equal to the number of the data pieces in the reception data string, and
the reception completion detector detects the completion of the transfer of the reception data string to the reception data buffer based on reception of the reception completion signal.

3. The parallel processing apparatus according to claim 2, wherein
when the fault detector detects the fault command, the reception completion detector stops the interrupt issuer from issuing an interrupt based on reception of the reception completion signal.

4. The parallel processing apparatus according to claim 1, wherein
each of the plurality of processing units includes
a transmission data register in which data pieces included in a response data string are stored sequentially piece by piece, the response data string being a data string that is generated by interrupt processing of processing the reception data string transferred to the reception data buffer and that is to be returned to the corresponding node,
a first transmission data counter that updates a counter value every time a data piece is stored in the transmission data register, and outputs a first transmission completion signal when the counter value is updated a number of times that is equal to the number of the data pieces in the response data string,
a second transmission data counter that updates a counter value every time a data piece stored in the transmission data register is transferred to the node, and outputs a second transmission completion signal when the counter value is updated a number of times that is equal to the number of the data pieces in the response data string, and
a transmission completion detector that detects completion of transmission of the response data string to the node when receiving both the first transmission completion signal and the second transmission completion signal, and
unless the fault detector detects the fault command, the interrupt issuer issues an interrupt based on detection of the completion of the transfer of the reception data string by the reception completion detector or detection of the completion of the transmission of the response data string by the transmission completion detector.

5. The parallel processing apparatus according to claim 4, wherein
when the fault detector detects the fault command, the transmission completion detector stops the interrupt issuer from issuing an interrupt based on reception of any of the first transmission completion signal and the second transmission completion signal.

* * * * *